United States Patent
Boberg

(10) Patent No.: US 10,114,136 B2
(45) Date of Patent: Oct. 30, 2018

(54) STREAMER EQUIPMENT TENSION CONTROL

(71) Applicant: PGS Geophysical AS, Oslo (NO)

(72) Inventor: Bengt Boberg, Kista (SE)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/418,240

(22) Filed: Jan. 27, 2017

(65) Prior Publication Data

US 2017/0235004 A1    Aug. 17, 2017

Related U.S. Application Data

(60) Provisional application No. 62/294,647, filed on Feb. 12, 2016.

(51) Int. Cl.
| | |
|---|---|
| *G01V 1/38* | (2006.01) |
| *G01V 1/30* | (2006.01) |
| *G01V 3/165* | (2006.01) |

(52) U.S. Cl.
CPC .............. *G01V 1/3808* (2013.01); *G01V 1/30* (2013.01); *G01V 1/3826* (2013.01); *G01V 3/165* (2013.01)

(58) Field of Classification Search
CPC ...... G01V 1/3808; G01V 1/30; G01V 1/3826; G01V 3/165; G01V 1/201; G01V 1/38; B63B 21/66
USPC .......................................................... 367/17
See application file for complete search history.

(56) References Cited

U.S. PATENT DOCUMENTS

| | | | |
|---|---|---|---|
| 3,359,536 A | 12/1967 | Coburn, Jr. | |
| 4,068,208 A | 1/1978 | Rice, Jr. et al. | |
| 4,581,723 A | 4/1986 | Savit | |
| 5,517,938 A | 5/1996 | Wood et al. | |
| 7,167,413 B1 * | 1/2007 | Rouquette | G01V 1/201 367/20 |
| 8,267,031 B2 | 9/2012 | Austad et al. | |
| 8,335,126 B2 | 12/2012 | Sudow et al. | |

(Continued)

FOREIGN PATENT DOCUMENTS

EP         2360496 A1     8/2011

OTHER PUBLICATIONS

International Search Report and Written Opinion for Application No. PCT/EP2017/053000 dated May 5, 2017.

*Primary Examiner* — Daniel L Murphy
(74) *Attorney, Agent, or Firm* — Patterson + Sheridan, LLP

(57) ABSTRACT

An apparatus for acquiring survey data including streamer equipment comprising a lead-in cable; and a geophysical streamer with a plurality of geophysical sensors distributed along the geophysical streamer, including a forward geophysical sensor; a depressor coupled to the streamer equipment in front of the forward geophysical sensor; a variable tension control device coupled at a back end of the geophysical streamer; and a plurality of tension control system sensors. A method for acquiring survey data including obtaining data from tension control system sensors of a geophysical streamer system; identifying an adjustment to be made to one or more tension control factors of the geophysical streamer system to reduce or control vibrational behavior of streamer equipment of the geophysical streamer system making the adjustment to the one or more tension control factors; and acquiring survey data with the geophysical streamer system.

21 Claims, 13 Drawing Sheets

(56) References Cited

U.S. PATENT DOCUMENTS

| | | |
|---|---|---|
| 8,400,871 B2 * | 3/2013 | Meldahl ............... G01V 1/3826 |
| | | 367/16 |
| 8,472,281 B2 | 6/2013 | Sudow et al. |
| 8,573,050 B2 | 11/2013 | Sudow et al. |
| 8,976,623 B2 | 3/2015 | Sudow et al. |
| 8,995,220 B2 | 3/2015 | Sudow et al. |
| 9,188,691 B2 | 11/2015 | Sudow et al. |
| 9,194,969 B2 | 11/2015 | Stokkeland et al. |
| 2009/0316526 A1 | 12/2009 | Grall |
| 2011/0158043 A1 * | 6/2011 | Johnstad ................ G01V 1/201 |
| | | 367/16 |
| 2012/0113746 A1 | 5/2012 | Sudow et al. |
| 2012/0250456 A1 | 10/2012 | Tenghamn |
| 2013/0010570 A1 | 1/2013 | Sudow et al. |
| 2013/0010571 A1 | 1/2013 | Sudow et al. |
| 2013/0025362 A1 | 1/2013 | Sudow et al. |
| 2013/0142012 A1 | 6/2013 | Schultz et al. |
| 2013/0286772 A1 | 10/2013 | Sudow |
| 2014/0016434 A1 | 1/2014 | Turnbull |
| 2014/0121977 A1 * | 5/2014 | Lecocq ................... G01V 1/38 |
| | | 702/11 |
| 2014/0153363 A1 | 6/2014 | Juhasz et al. |
| 2014/0169125 A1 | 6/2014 | Voisin |
| 2014/0254310 A1 | 9/2014 | Voldsbekk |
| 2015/0003195 A1 | 1/2015 | Widmaier et al. |
| 2015/0028156 A1 | 1/2015 | Wiggins et al. |
| 2015/0117148 A1 | 4/2015 | Orange et al. |
| 2015/0117716 A1 | 4/2015 | Ursin et al. |
| 2015/0153469 A1 | 6/2015 | Sudow et al. |
| 2015/0331129 A1 | 11/2015 | McKey, III |
| 2016/0031529 A1 | 2/2016 | Sudow et al. |
| 2016/0041282 A1 | 2/2016 | Stokkeland et al. |

* cited by examiner

STREAMER EQUIPMENT VIBRATION

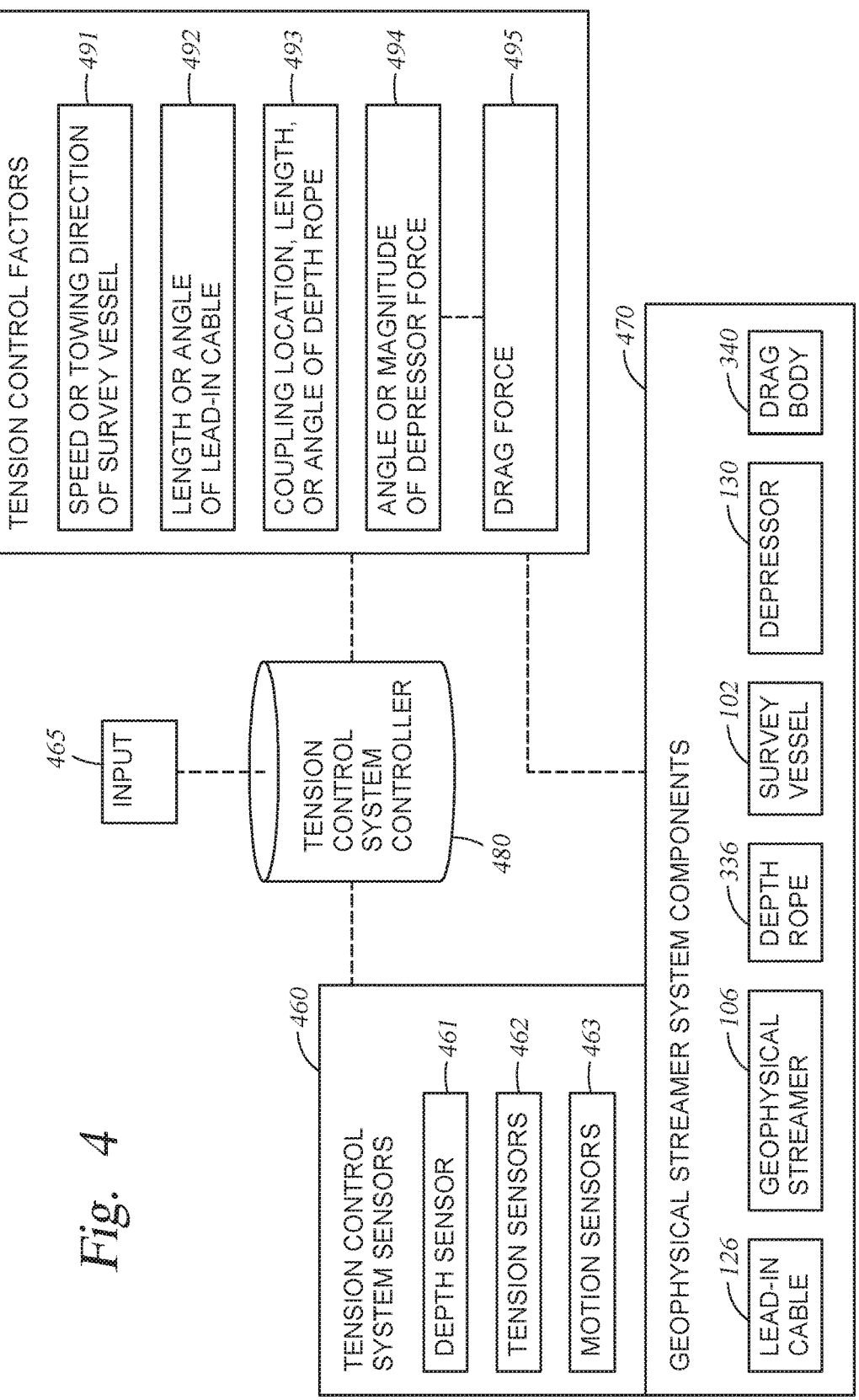

STREAMER EQUIPMENT TENSION CONTROL

BACKGROUND OF THE INVENTION

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and sensors—either towed or ocean bottom—receive energy generated by the sources and possibly affected by interaction with subsurface formations. Towed sensors may be disposed on cables referred to as streamers. The sensors thereby acquire survey data which can be useful in the discovery and/or extraction of hydrocarbons from subsurface formations.

During marine surveying operations, a streamer and its related equipment may experience mechanical vibration. For example, waves, currents, heave, and other forces between towed components and the surrounding water may cause cable displacement, and opposing forces, such as tension and drag, may cause rebounding counter-displacement. Such mechanical vibration of the streamer equipment may have an impact on the acquisition of survey data. For example, electromagnetic induction currents may be imparted to components within a vibrating cable. It is currently believed that such induction currents may create induction noise in the survey data—either seismic survey data or electromagnetic survey data. Moreover, for electromagnetic surveys, induction noise is considered to be one of the largest, if not the largest, noise source. While some techniques exist to mitigate the effects of induction noise on survey data, it would be beneficial to reduce or control streamer equipment vibration, thereby reducing or controlling induction noise.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 4 shows a functional diagram of a tension control system.

DETAILED DESCRIPTION

Figure 1A:
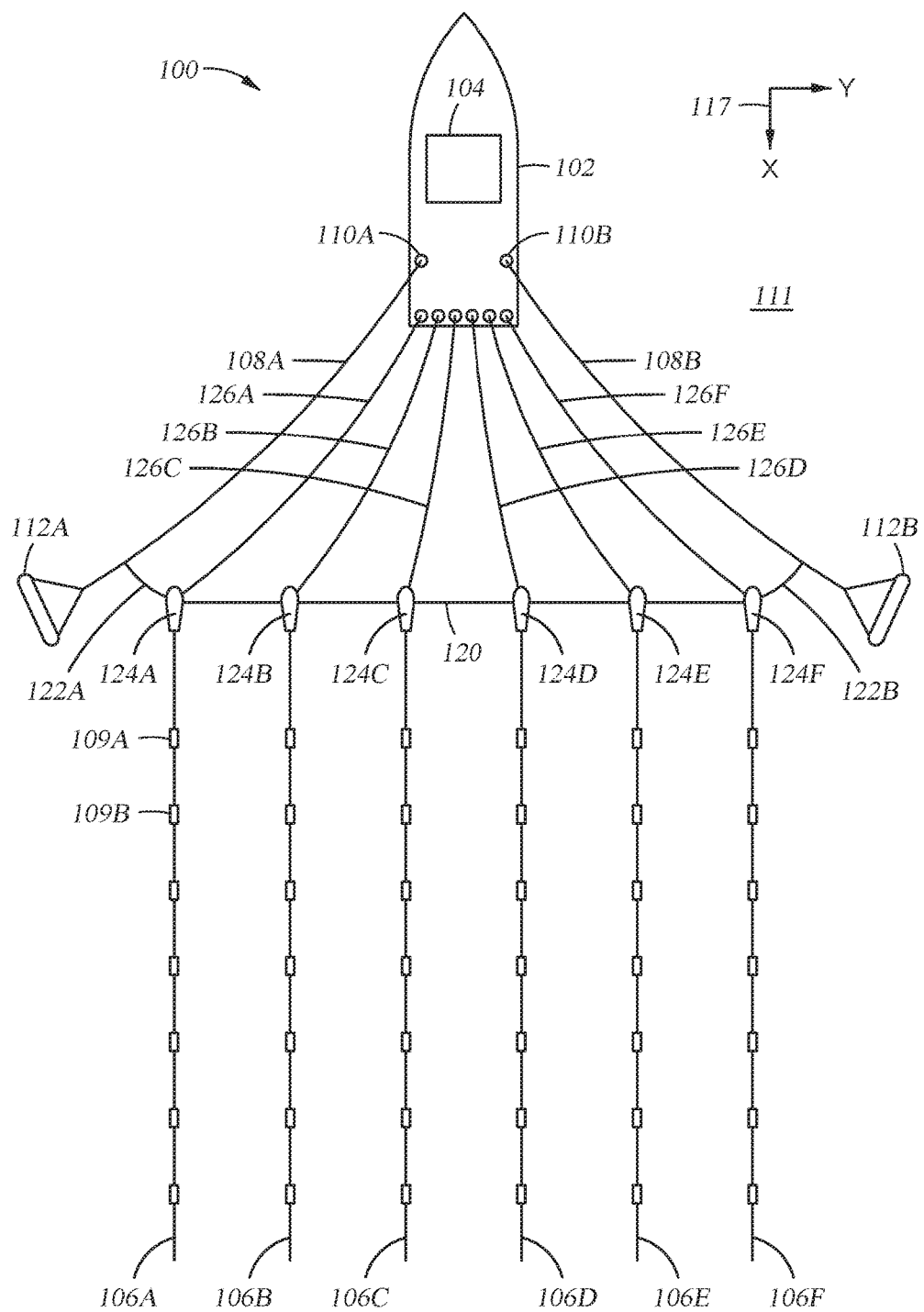
FIG. 1A shows an overhead view of a marine survey system.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Submerged" shall mean that an object resides fully below the surface of the water. If any portion of the object resides above the surface, then the object shall not be considered submerged. "Submerges" shall mean that an object becomes submerged.

"Buoyancy" of an object shall refer to buoyancy of the object taking into account any weight supported by the object.

"Tuning" a system with a line and weighted components coupled to the line shall mean adjusting one or more of the length of the line, the tension of the line, the weight of the line, the elasticity of the line, the location of the couplings of the weighted components along the line, and the weight of the weighted components in order to modify the characteristics (such as wavelength, amplitude, frequency, node location and number, etc.) of the vibrational behavior of the line.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Obtaining" data shall mean any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

If there is any conflict in the usages of a word or term in this specification and one or more patent or other documents that may be incorporated herein by reference, the definitions that are consistent with this specification should be adopted for the purposes of understanding this invention.

The present invention generally relates to marine surveying methods and apparatuses, and, at least in some embodiments, to novel geophysical streamer systems, and their associated methods of use to reduce or control streamer equipment vibration, thereby reducing or controlling induction noise.

One of the many potential advantages of the embodiments of the present disclosure is that streamer equipment vibration may be reduced or controlled. Another potential advantage includes reducing or controlling induction noise in survey data. Embodiments of the present disclosure can thereby be useful in the discovery and/or extraction of hydrocarbons from subsurface formations.

FIG. 1A shows an overhead view of a marine survey system 100 in accordance with at least some embodiments. In particular, FIG. 1A shows a survey vessel 102 having onboard equipment 104, such as navigation, source control, and data recording equipment. Survey vessel 102 is configured to tow one or more geophysical streamers (or simply "streamers") 106A-F through the water 111. While FIG. 1A illustratively shows six streamers 106, any number of streamers 106 may be equivalently used.

The streamers 106 are coupled to towing equipment that helps to maintain the streamers 106 at selected lateral positions with respect to each other and with respect to the survey vessel 102. The towing equipment may comprise, for example, paravane tow lines 108A-B, winches 110A-B, paravanes 112A-B, one or more spreader lines 120, and spur lines 122A-B. Other configurations and compositions of towing equipment may be equivalently used.

The streamers 106 may each be coupled, at the ends nearest the survey vessel 102 (i.e., the forward or proximal end, the "front" of the streamer) to a respective lead-in cable termination 124A-F. In some embodiments, lead-in cable terminations 124 may be simple couplings. In some embodiments, lead-in cable terminations 124 may include components such as deflectors, signal repeaters or enhancers, depth, tension, or motion sensors, or other useful components. The lead-in cable terminations 124 may be coupled to or associated with the spreader line(s) 120 so as to control the lateral positions of the streamers 106 with respect to each other and with respect to the survey vessel 102. Lead-in cables 126A-F may provide electrical and/or optical connections between the appropriate components in the onboard equipment 104 (such as data recording equipment) and the components of the streamers 106 (such as geophysical sensors 109A-B). Much like the tow lines 108 associated with respective winches 110, each of the lead-in cables 126 may be deployed by a respective winch or similar spooling device such that the deployed length of each lead-in cable 126 can be changed. In some embodiments, a single lead-in cable 126 may be associated with more than one streamer 106. The lead-in cable 126 may include electrical and/or optical conductors that enable real time communication between the geophysical sensors 109 and the onboard equipment 104.

Geophysical sensors 109 can include, for instance, seismic sensors and/or electromagnetic sensors, among others. The seismic sensors can include hydrophones, geophones, pressure sensors, particle motion sensors, among other types of seismic sensors, and/or combinations thereof. The electromagnetic sensors include electrode pairs, magnetic loops, among other types of electromagnetic sensors, and/or combinations thereof. Geophysical sensors 109 may be used to acquire survey data during marine surveying operations. For example, geophysical sensors 109 may sense and/or measure geophysical properties that may be indicative of properties of the subsurface formation 113 (see FIG. 1B).

Figure 1B:
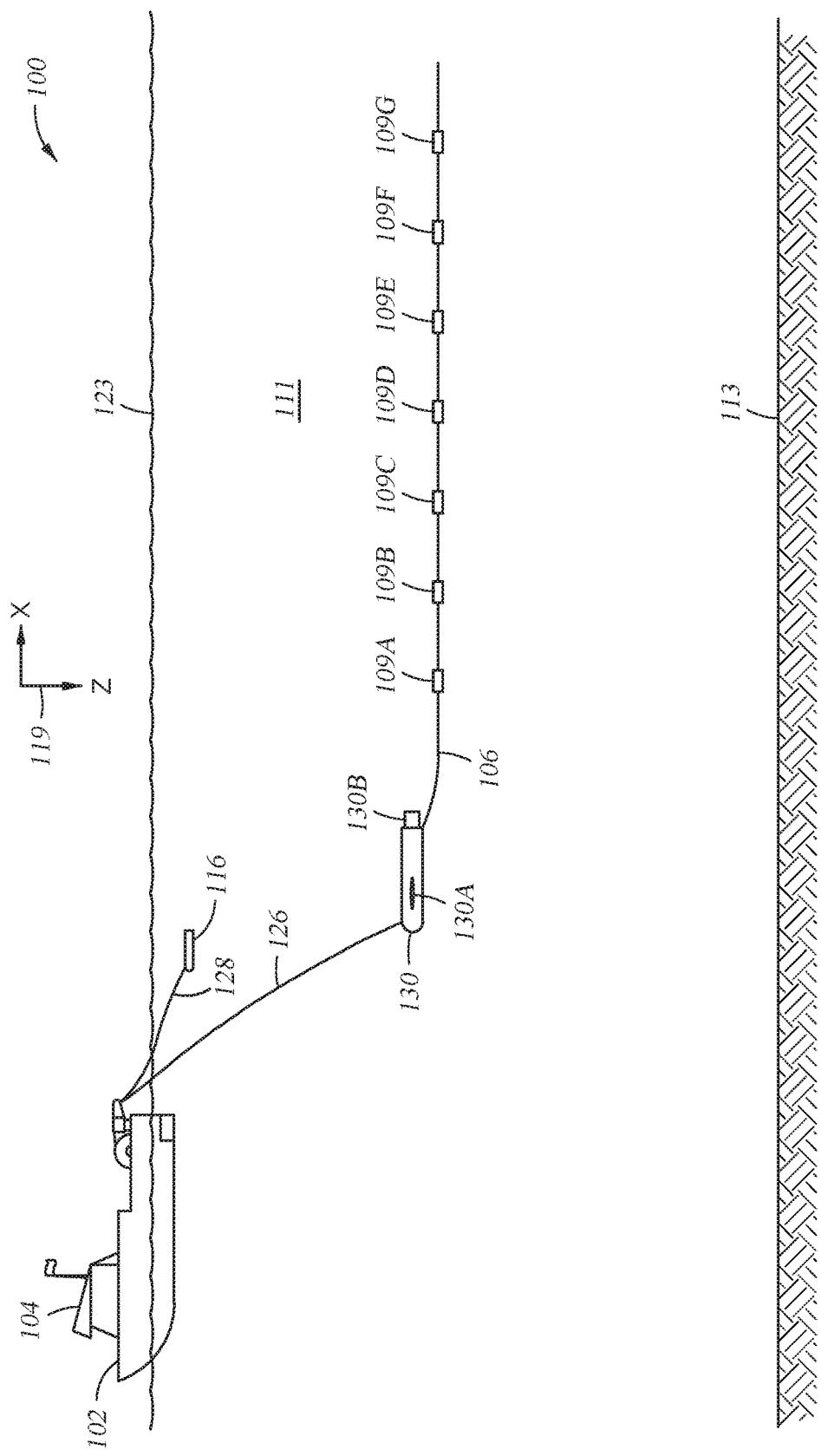
FIG. 1B shows a side view of the marine survey system.

FIG. 1B shows a side view of marine survey system 100 in accordance with at least some embodiments. In particular, FIG. 1B shows survey vessel 102 towing streamer 106 and geophysical source 116 through the water 111. Streamer 106 may be coupled to survey vessel 102 with lead-in cable 126, and geophysical sensors 109A-G may be distributed along streamer 106. Survey vessel 102 may tow one or more geophysical sources 116 on one or more source cables 128. In various embodiments, geophysical source 116 may be a seismic source, which can include one or more air guns and/or marine vibrators, among other common seismic sources. In various embodiments, geophysical source 116 may be an electromagnetic source, which can include one or more electric dipoles or magnetic loops, among other common electromagnetic sources. In various embodiments, survey vessel 102 may tow zero, one, or multiple geophysical sources 116. One or more geophysical sources may be towed by additional survey vessel(s) (not shown).

In FIG. 1B, streamer 106 may be towed at a selected depth in the water 111. In various embodiments, streamer 106 may be towed essentially horizontal, at a single depth along the entire streamer. In various embodiments, streamer 106 may have a more varied depth profile, such as slanted with a uniform angle to horizontal along the entire streamer, or such as following the topography of the sea floor, for example. Depressor 130 may assist in depth control for streamer 106. In some embodiments, the depressor 130 may receive power and/or control signals to change depth and/or direction (using control surfaces such as diving planes 130A and rudder 130B) from a lead-in cable 126 connected from the depressor 130 to the survey vessel 102. In some embodiments, the depressor 130 may be a passive device such as a weight. In some embodiments, depending on the desired towing depth, depressor 130 may be considerably smaller (less weight and/or smaller control surfaces) than in other embodiments. As would be understood by one of ordinary skill in the art with the benefit of this disclosure, depressor 130 may be coupled at or near lead-in cable termination 124, or depressor 130 may be coupled along streamer 106 between lead-in cable termination 124 and a forward (closer to a front end of the streamer than any other of the geophysical sensors) geophysical sensor 109A, or depressor 130 may be coupled along the lead-in cable 126. In each instance, depressor 130 is coupled in front of the forward geophysical sensor. In some embodiments, depressor 130 may be coupled to lead-in cable 126 and/or streamer 106 with a depth rope 336 (see FIG. 3).

FIG. 1A includes an xy-plane 117, and FIG. 1B includes an xz-plane 119 of the same Cartesian coordinate system used to specify coordinate locations within the water 111 and the subsurface formation 113 with respect to three orthogonal, spatial coordinate axes labeled x, y and z. The x coordinate uniquely specifies the position of a point in a direction anti-parallel to the path of travel of the survey vessel 102 at a particular point in time (referred to herein as the inline direction), the y coordinate uniquely specifies the position of a point in a direction perpendicular to the x axis and substantially parallel to the surface 123 of the water 111 at survey vessel 102 (referred to herein as the crossline direction), and the z coordinate uniquely specifies the position of a point perpendicular to the xy-plane measured downward from the surface 123 (i.e., depth).

During marine surveying operations, streamer (cable) 106 and/or lead-in cable 126 may experience mechanical vibration. For example, water waves, water currents, vessel heave, and other forces between towed components and the surrounding water may cause cable displacement, and opposing forces, such as tension and drag, may cause rebounding counter-displacement. The cables may thus vibrate in the horizontal (y) or vertical (z) direction (or a combination of the two, for example circularly polarized). Depending on a number of factors, including tension in the cables, length of the cables, density of the cables, surrounding water density and pressure, etc., the vibration may be characterized as a wave with characteristics such as amplitude, wavelength ($\lambda$), nodes (locations of minimum vibration or zero amplitude), and frequency. When discussing such vibrations, the streamer 106, the lead-in cable 126, and/or the combination of the streamer 106 and the lead-in cable 126 shall be referred to herein as "streamer equipment".

If the length of the streamer equipment is L, the fundamental harmonic is the one produced by the vibration with nodes at the two ends of the streamer equipment, but none therebetween, so L is half of the wavelength of the fundamental harmonic. Hence one obtains Mersenne's laws:

$$f = \frac{1}{2L}\sqrt{\frac{T}{\mu}} \quad (1)$$

where T is the tension (in Newton), μ is the linear density (that is, the mass per unit length), and L is the length of the vibrating part of the streamer equipment. It is currently believed that increasing tension correlates with decreased vibrational amplitude and/or velocity. Consequently, it is expected that increasing tension in streamer equipment may reduce induction noise. Likewise, changing tension in streamer equipment is expected to change the spectral density of the vibrational motion, thereby changing frequency and/or amplitude of existent resonance peaks.

If the streamer equipment is considered as a pinned-pinned cable with negligible bending stiffness and infinite axial stiffness, and if the tension is assumed constant over the cable length, the natural frequencies of transverse motion (in Hz) can be stated as:

$$f_n = \frac{n}{2L}\sqrt{\frac{T}{m_t}} \quad (2)$$

where n is mode number, L is cable length in meters, T is tension in Newtons, and $m_t$ is mass per unit length in kg/m, including added mass. The corresponding mode wave length is:

$$\lambda_n = \frac{2L}{n} \quad (3)$$

Solving for the wave length as a function of the natural frequency yields:

$$\lambda_n = \frac{1}{f_n}\sqrt{\frac{T}{m_t}} \quad (4)$$

For a neutrally buoyant streamer equipment with diameter of 0.07 m, and an added mass coefficient of 1.0, $m_t$=7.9 kg/m. Then the wave length for $f_n$=0.5 Hz is 0.71 √T, giving a wave length of 100 m for T=20 kN.

Alternatively, the tension may be assumed to vary linearly from the aft end to the forward end of the streamer equipment. If the tension is assumed to be 2 kN at the aft end and 100 kN at the forward end of 6000 m long streamer equipment, F=0.5 Hz corresponds approximately to mode number 90. Consequently, the average "mode wave length" is approximately 130 m. However, the mode wave length may decrease significantly from forward end to aft end due to the tension variation. In other words, the amplitude of the wave is expected to decrease from the forward end of the streamer equipment to the aft end. For this particular example, the mode wave length is approximately 220 m in the forward end and 30 m at the aft end. The local wave length can be approximated using the above formula with the local tension T=T(x).

Such mechanical vibration of the streamer equipment may have an impact on the acquisition of survey data. In one example, mechanical vibration of the streamer equipment may create seismic survey data noise as seismic sensors on the streamer attempt to measure changes in water pressure and/or water particle motion. In another example, electromagnetic induction currents may be imparted to components within vibrating streamer equipment. The streamer equipment may be subject to the earth's magnetic field and/or an electromagnetic field generated by an electromagnetic source, among other possible electromagnetic fields. Motion of metallic streamer equipment components (e.g., wires, capacitors, electrodes, screws, plates, etc.) through such electromagnetic fields may generate electromagnetic induction currents. It is currently believed that such induction currents may create induction noise in the survey data—either seismic survey data or electromagnetic survey data. Moreover, for electromagnetic surveys which often utilize wires between pairs of electromagnetic sensor electrodes, induction noise is considered to be one of the largest, if not the largest, noise source.

Figure 2A:
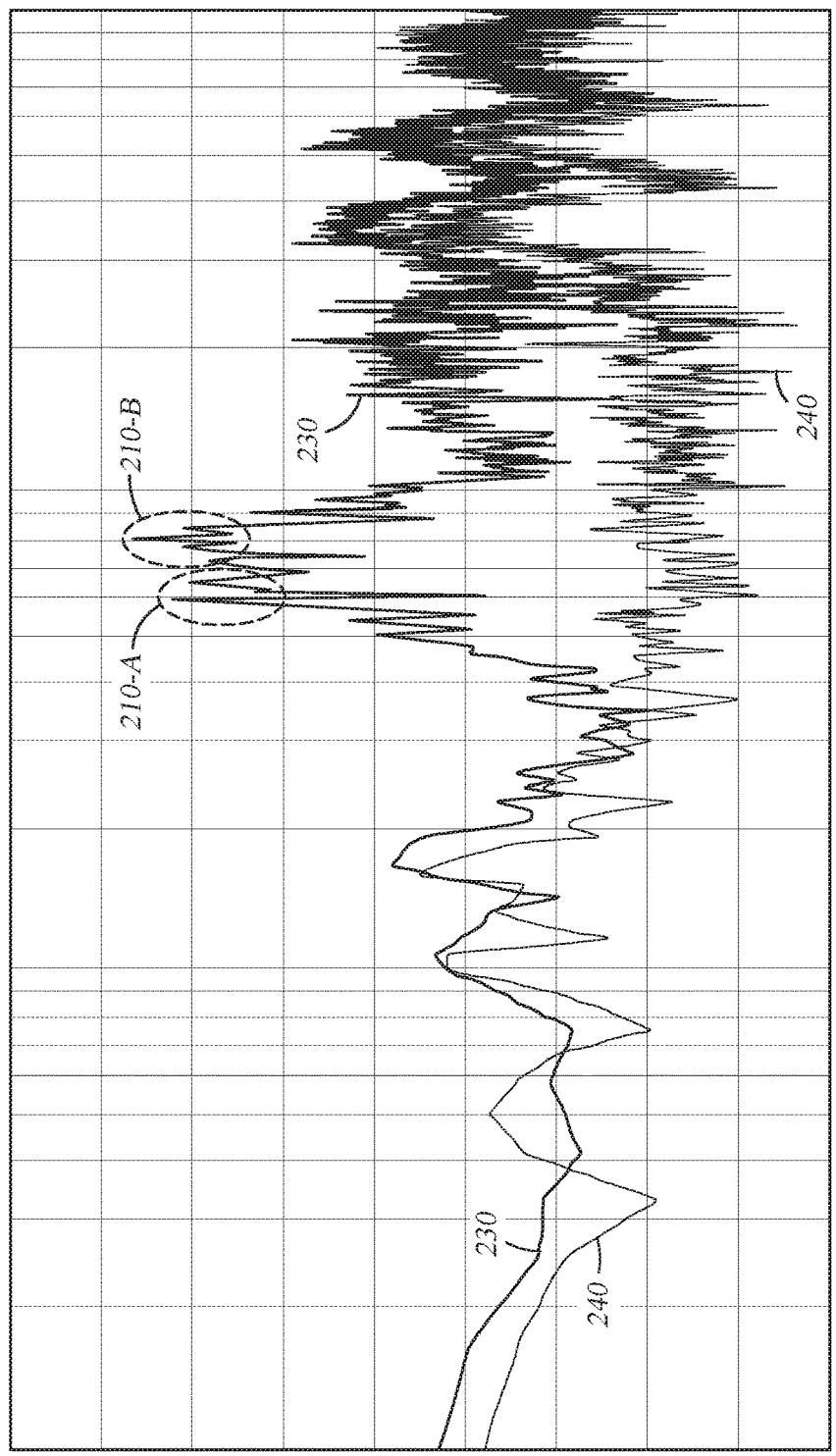
FIGS. 2A-B illustrates measured streamer equipment behavior during marine surveying operations.
Figure 2B:
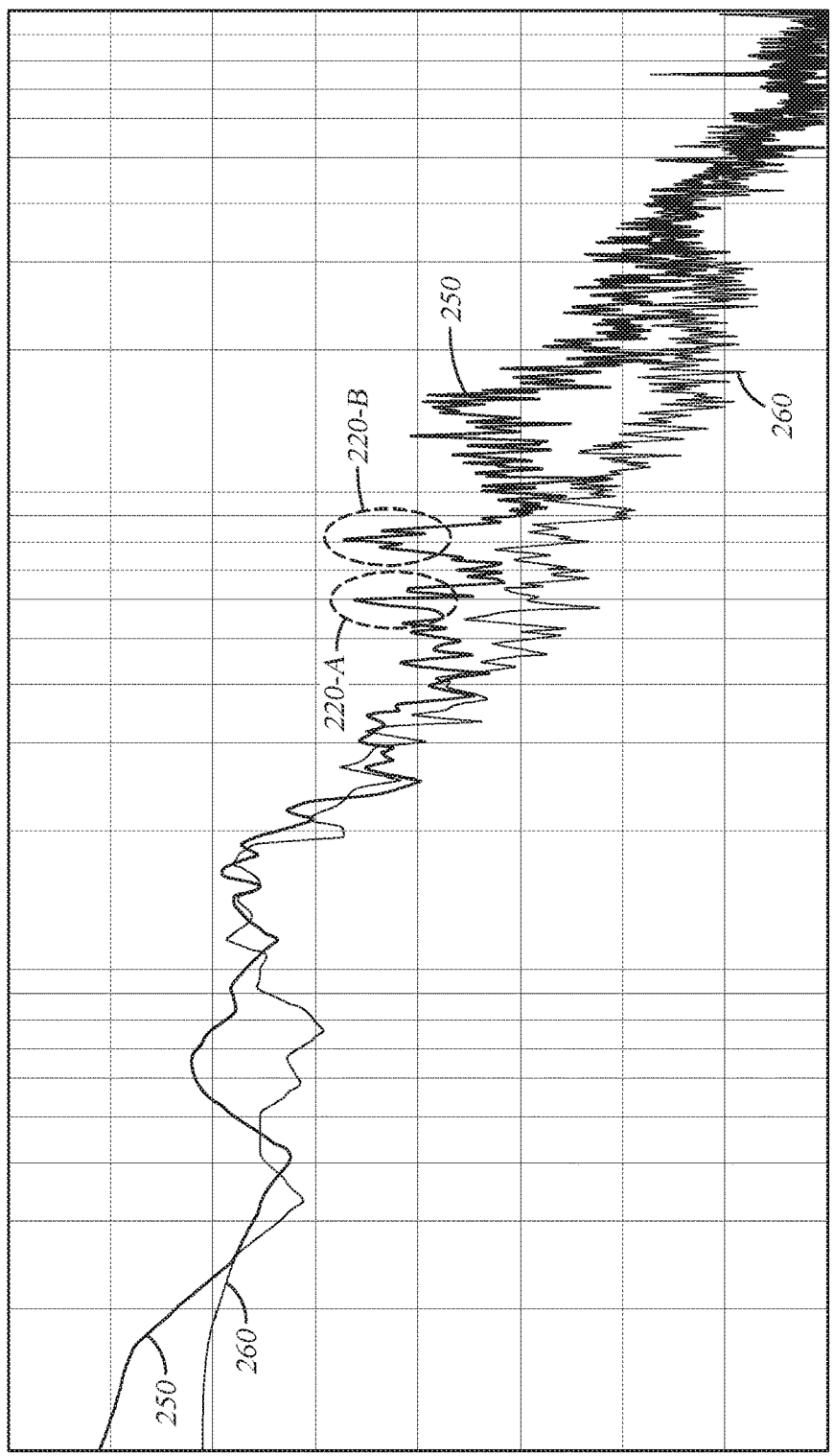

FIGS. 2A-B illustrate the effects of streamer equipment vibration on electromagnetic field survey data. The top graph is a spectral density plot of measured streamer equipment vibration at a location of an electromagnetic sensor on a streamer. Curve 240 shows measurements of vibrations at the beginning of a survey towing operation—before significant vibrational wave patterns coalesce. Curve 230 shows measurements of vibrations after the survey towing operation has been underway. Vibrational peaks 210-A,B can be seen, indicating the existence of vibrational wave patterns at the location of the electromagnetic sensor. The bottom graph is a spectral density plot of measured electromagnetic field strength with the electromagnetic sensor. Curve 260 shows the corresponding measurements of the background electromagnetic field (e.g., the earth's magnetic field) at the beginning of the survey towing operation. Curve 250 shows the effect of induced electromagnetic fields on the total field measurement (e.g., the earth's magnetic field plus field contributions from the electromagnetic source and response from the subsurface formation). Electromagnetic field peaks 220-A,B can be seen corresponding to the vibrational peaks of the top graph.

The vibrational behavior of a geophysical streamer and/or a marine survey system during marine surveying operations may be modeled. For example, modeling and/or simulation of the geophysical streamer systems of a marine survey system may provide better understanding of streamer equipment vibration, and thereby better understanding of induction noise. Parameter variation and/or batch simulations may be used to identify factors contributing to the vibrational behavior of streamer equipment. A marine survey system may thereby be tuned to reduce or control streamer equipment vibration. For example, it may be possible to identify one or more locations for coupling a depressor to a geophysical streamer system to reduce or control streamer equipment vibration. As another example, tuning the vibrational behavior of the streamer equipment may allow for better noise estimation and/or mitigation during survey data processing.

Modeling the vibrational behavior of a geophysical streamer system during marine surveying operations may produce a predicted vibrational wave. For example, nodes may be located at x=0, λ/2, λ, 3λ/2, . . . , where the vibration is minimal or the amplitude is close to zero. Anti-nodes may be located at x=λ/4, 3λ/4, 5λ/4, . . . , where, the amplitude is maximum. It is currently believed that streamer equipment vibration may be reduced or controlled by coupling depressor 130 at a node along lead-in cable 126. It is also currently believed that induction noise may be reduced or controlled by coupling other geophysical streamer system components (e.g., geophysical sensors, lateral force control devices, depth control devices, birds, spreader lines, rope attachments, etc.) at nodes along the streamer equipment. Some models of vibrational behavior of typical geophysical streamer systems predict vibrational wavelengths of about 100-about 1000 meters, streamer equipment tension of about 1.5-about 2.5 tons, and unadjusted drag force of about 250-about 750 N.

Figure 2C:
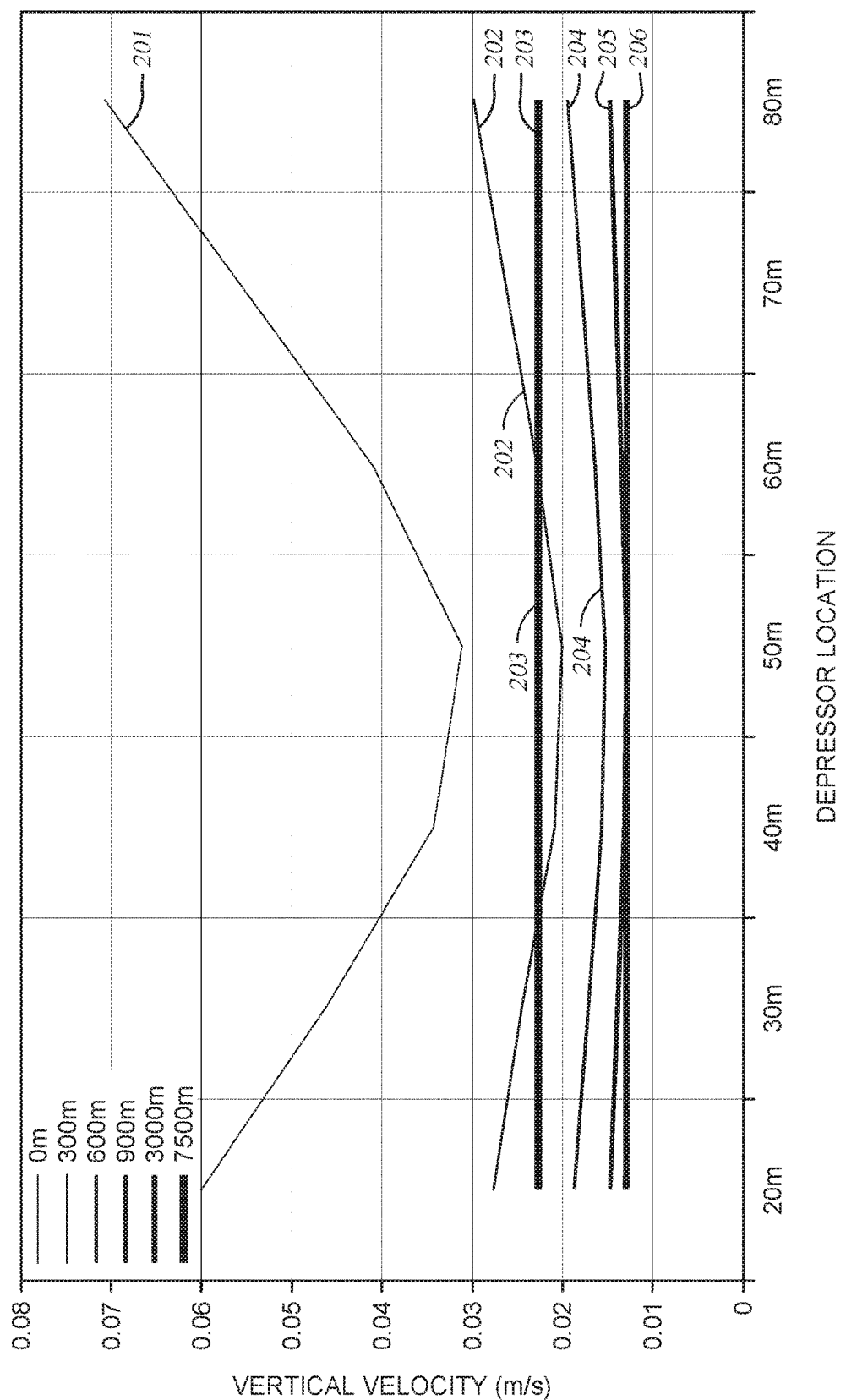
FIG. 2C illustrates a model of streamer equipment behavior during marine surveying operations.

FIG. 2C illustrates a model of streamer equipment behavior during marine surveying operations. The model includes a hydrodynamic simulation of streamer equipment behavior that accounts for factors such as survey vessel configuration (e.g., profile, speed), cable configuration (e.g., length, weight, stiffness, drag), water conditions (e.g., wave height, wave frequency), depressor configuration (e.g., weight, drag), and drag body configuration (e.g., weight, drag). The figure shows the cable vertical velocity at six locations along the streamer (0 m, 300 m, 600 m, 900 m, 3000 m, and 7500 m from the lead-in cable termination) as varied by location of the depressor 130 along the lead-in cable (20 m, 30 m, 40 m, 50 m, 60 m, 70 m, and 80 m in front of the lead-in cable termination). Each of the curves 201-206 has a minimum for depressor location=50 m in front of the lead-in cable termination. According to this model, coupling the depressor at 50 m in front of the lead-in cable termination may reduce or control streamer equipment vibration, thereby tuning the marine survey system. In other words, changing the location of the coupling of the depressor to a predicted vibrational wave node (where the streamer equipment vibration is a minimum), the streamer motion along the length of the streamer, and consequently the induction noise, can be reduced. In some embodiments, modeling of streamer equipment behavior may be utilized to determine initial configuration of the geophysical streamer system and components thereof.

In addition to, or in lieu of, moving the depressor, streamer equipment vibration may be reduced or controlled by changing the tension of the streamer. Due to operational considerations (e.g., towing and handling properties of the marine survey system), changing the streamer equipment tension may be more acceptable in some instances than changing the depressor/towing configuration. Moving the depressor requires retrieval and redeployment of the streamer, so mid-survey adjustments to tension of the streamer equipment could be more easily achieved than mid-survey adjustments to depressor location. For example, during marine surveying operations, water currents may change, causing streamer equipment vibrations to change. It may be desired to make adjustments to the streamer equipment tension during survey data acquisition to reduce or control streamer equipment vibration. In some embodiments, it may be desired to make adjustments to the streamer equipment tensions during various navigational maneuvers, such as when the survey vessel is turning between acquisition lines, and/or during deployment or retrieval of the streamer equipment.

Figure 3:
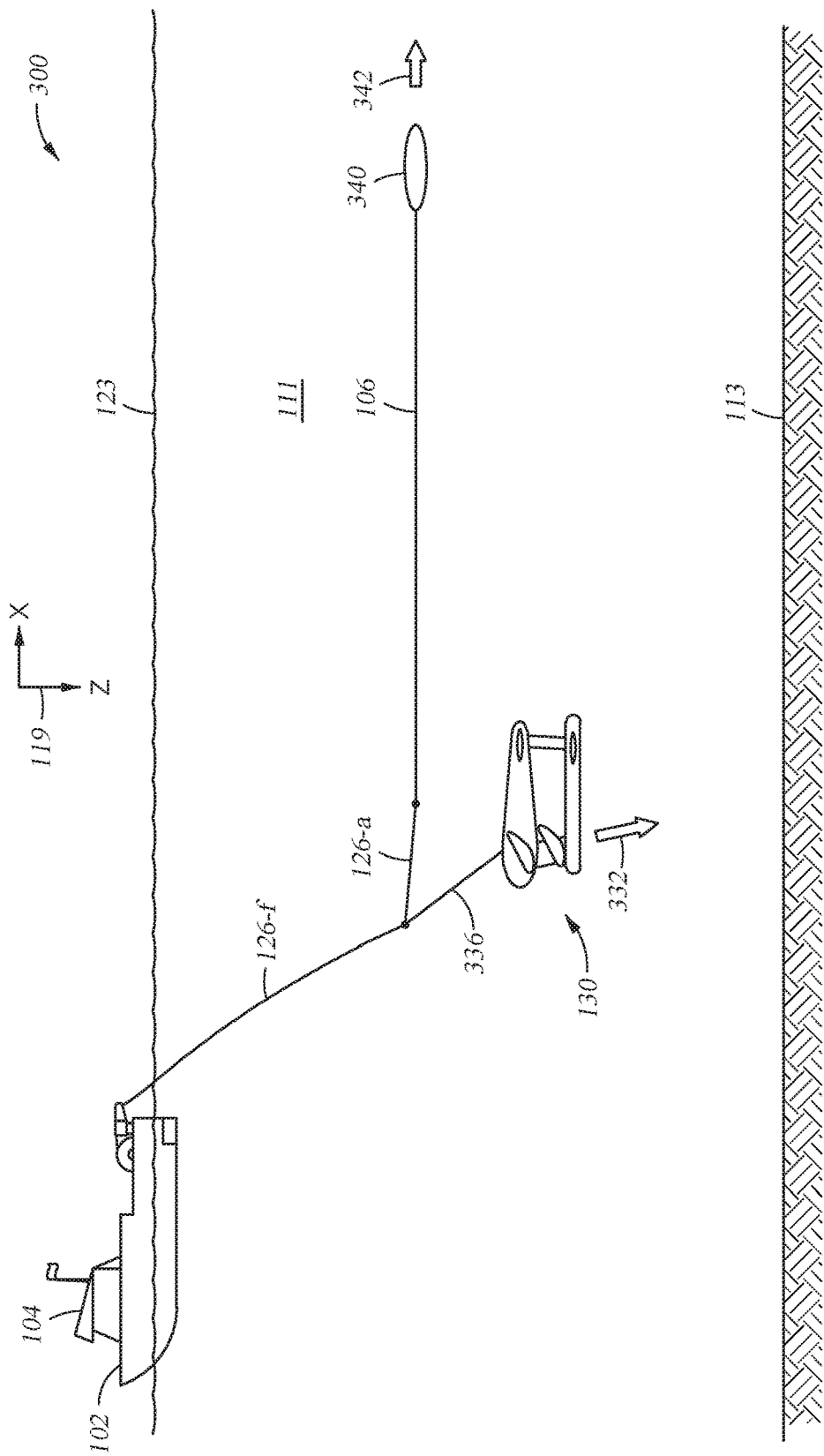
FIG. 3 shows a side view of a marine survey system.

FIG. 3 shows a side view of a marine survey system 300 in accordance with at least some embodiments. In particular, FIG. 3 shows survey vessel 102 towing streamer 106 through the water 111. Streamer 106 may be coupled to survey vessel 102 with lead-in cable 126. A depressor 130 may be coupled in front of the front end of the streamer, along lead-in cable 126. As illustrated, lead-in cable 126 can be thought of as having two portions: portion 126-f forward of the coupling for depressor 130, and portion 126-a aft of the coupling for depressor 130. Depth rope 336 may be used to couple depressor 130 to lead-in cable 126. A variable tension control device, such as drag body 340, may be coupled at a back (aft) end of the streamer 106. As illustrated, the variable tension control device is capable of providing force in the x-direction (i.e., drag). In various embodiments, the variable tension control device also may be capable of providing force in the y-direction (i.e., lateral force) and/or the z-direction (i.e., depth control). In various embodiments, the variable tension control device may be used in conjunction with or in lieu of a tail buoy.

Tension in streamer 106 and lead-in cable 126 may be adjusted by adjusting one or more of the tension control factors: the speed or towing direction of survey vessel 102, the length or angle of lead-in cable 126, the coupling location, length, or angle of depth rope 336, the angle or magnitude of depressor force 332 of depressor 130, and the drag force 342 of drag body 340. It should be appreciated that adjusting just one of the tension control factors may result in unacceptable changes in the towing configuration. For example, if the drag force 342 of drag body 340 is increased with all other tension control factors held fixed, the front end of the streamer 106 will rise. (The opposing force in the x-direction from the survey vessel 102 will increase, causing the axial load on lead-in cable 126 to increase, causing the upward force in the z-direction exerted by the lead-in cable 126 to increase, causing the front end of streamer 106 to rise.) Consequently, in some embodiments, tension in streamer 106 may be adjusted by concerted adjustments of the depressor force 332 and the drag force 342.

As illustrated in FIG. 4, a tension control system 400 may be used to identify when and to what extent streamer equipment tension should be adjusted, and, in response, to adjust tension control factors, including concerted adjustments of the depressor force 332 and the drag force 342. Components of the tension control system 400 may be disposed on or in one or more of survey vessel 102, onboard equipment 104, streamer 106, geophysical sensor 109, lead-in cable termination 124, lead-in cable 126, depressor 130, depth rope 336, drag body 340, paravane tow lines 108A-B, paravanes 112A-B, spreader lines 120, spur lines 122A-B, lateral force control devices, depth control devices, birds, other equipment used for towing and/or handling streamer spreads, another vessel (not shown), or onshore. The tension control system may be passive, pre-programmed, automated, subject to mid-operation intervention, or a combination thereof. The tension control system 400 may include a number of tension control system sensors 460 (e.g., depth sensors 461, tension sensors 462, and/or motion sensors 463) disposed on geophysical streamer system components 470. For example, the tensions control system sensors 460 may be distributed along the lead-in cable 126, along the streamer 106, along the depth rope 336, on the survey vessel 102, on the depressor 130, and/or on the drag body 340. The tension control system 400 may include a tension control system controller 480 to obtain and/or analyze data from tension control system sensors 460. Alternatively the tension control system controller may be subject to mid-operation intervention, obtaining and/or analyzing user input in addition to or in lieu of the data from the tension control system sensors 460 in order to identify and adjustment to be made to the tension control factors 490. The data from the tension control system sensors 460 may be indicative of vibrational behavior of streamer equipment. The tension control system controller 480 may send control signals to adjust the tension control factors 490. For example, the tension control system controller 480 may send control signals to adjust the speed or towing direction of survey vessel 491, the length or angle of lead-in cable 492, the coupling location, length, or angle of depth rope 493, the angle or magnitude of depressor force 494, and/or the drag force 495. The control signals may provide for concerted adjustments of the angle or magnitude of depressor force 494 and of the drag force 495. Alternatively, when acting in a passive or pre-programmed mode, the geophysical streamer system components 470 may directly adjust the tension control factors 490 without data analytics from tension control system controller 480. Components of the tension control system may be communicatively coupled with one another to transmit and receive input data (such as data from the tension control system sensors) and to transmit and receive control signals (such as signals directing actuation of depressor diving planes or rudder). In some embodiments, tension control factors may be adjusted simultaneously with acquisition of survey data. In some embodiments, there may be repeated iterations of obtaining data with a plurality of tension control system sensors distributed along the streamer equipment, and making concerted adjustments of the depressor force and the drag force.

Adjusting the tension in the streamer and/or lead-in cable may affect streamer equipment vibration by tuning the vibrational wave. For example, adjusting the tension in the streamer equipment may tune the vibrational wave to change (e.g., reduce) the amplitude of the vibrational wave. Adjusting the tension in the streamer equipment may also tune the vibrational wave to change the location of the nodes. For example, the vibrational wave may be tuned to locate a node at or near the coupling for the depressor and/or other strategic components of the geophysical streamer system. Adjusting the tension in the streamer equipment may also tune the vibrational wave to change the frequency of the vibrational wave. It may be desirable to tune the vibrational wave to have a frequency outside of a normal survey data acquisition frequency range. For example, it may be desirable to tune the vibration al wave to have a frequency range outside of about 0.08 Hz to about 200 Hz, or outside of about 0.08 Hz to about 1.2 Hz, or outside of about 0.1 Hz to about 10 Hz, or outside of about 1 Hz to about 160 Hz.

An adjustable depressor may be used. Note that by rotating the depressor force 332 more downwards, the depressor 130 will go deeper, resulting in less of the depressor force 332 projected in the x-direction (i.e., the same direction as the drag force 342). This in turn results in a higher streamer equipment tension. Conversely, the streamer will go more shallow when the depressor force 332 is rotated to point more in the x-direction. The depressor force 332 may be controlled by varying the rotation angle of the depressor diving planes 130A or rudder 130B.

Figure 5A:
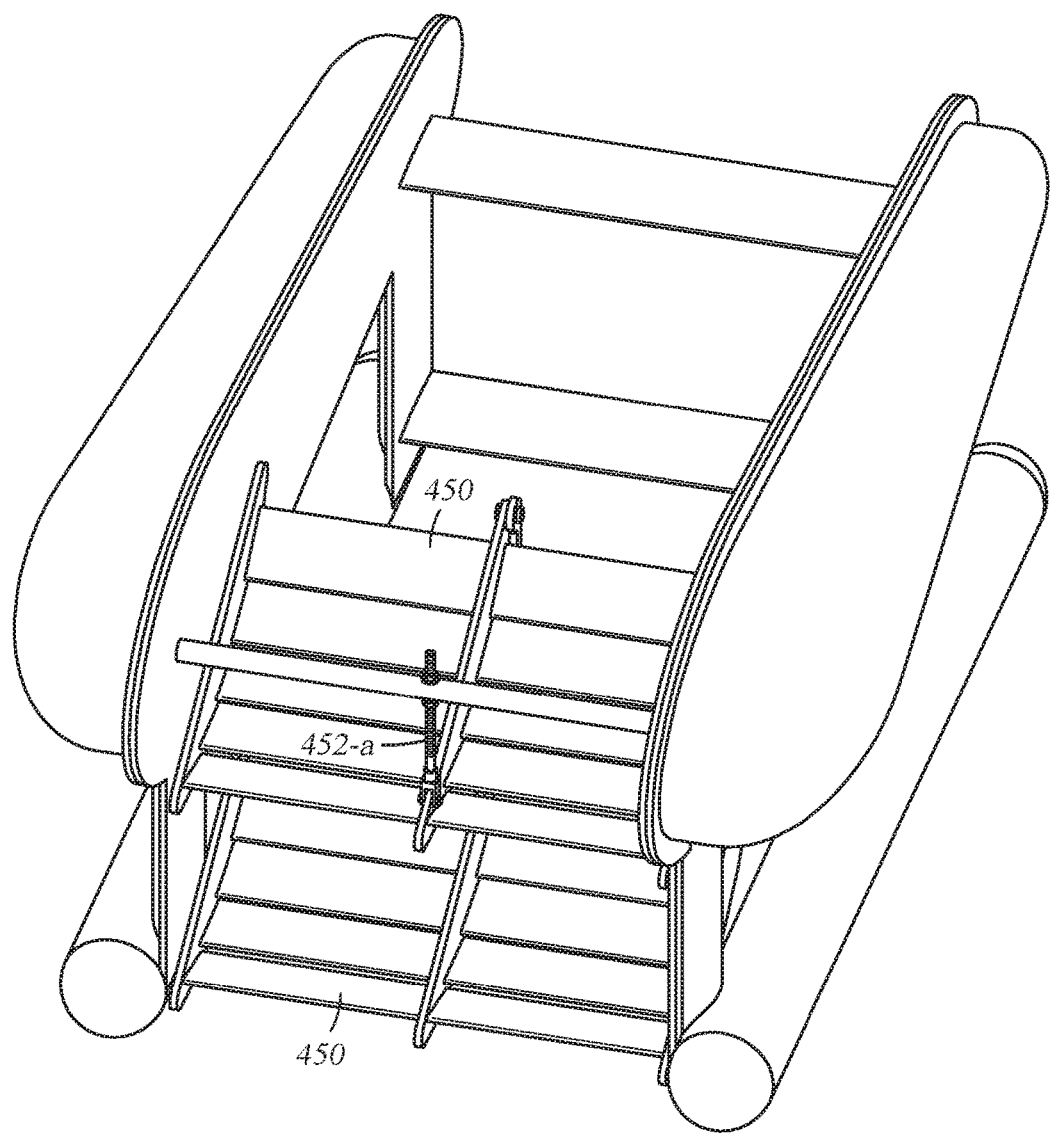
FIG. 5A shows a front view of a depressor.
Figure 5B:
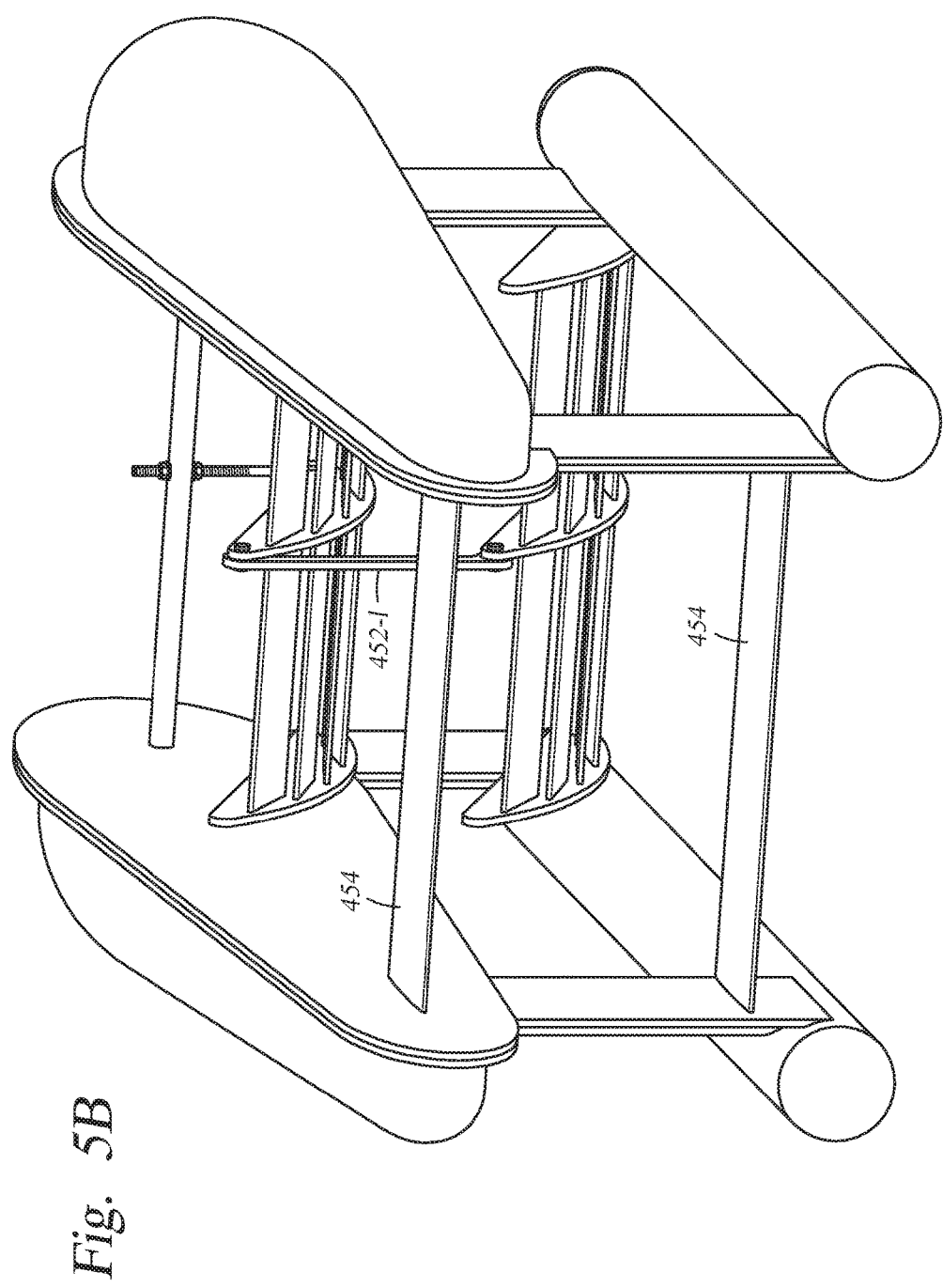
FIG. 5B shows a rear view of the depressor.

FIG. 5A shows a front view of a depressor 130. The depressor 130 has upper and lower multi foil wings 450 that are coupled with a link 452-I in the rear (see FIG. 5B). If the threaded vertical actuator 452-a in the center is moved, both the upper and lower multi foil wings will rotate, since they are mechanically linked together in the rear. FIG. 5B shows a rear view of a depressor 130. The depressor has rear wings 454. The link 452-I between the upper and lower multi foil wing 450 is shown. A link could also be used between the upper and lower rear wing when introducing an actuator for control of the depressor. After actuation of the actuator 452-a, causing rotation of the multi foil wings 450, the depressor pitch angle may be adjusted with the two rear wings 454. The upper and lower rear wing angles may be changed so that the depressor may maintain a low or zero attitude angle. In some embodiments, both pitch and roll angles may be maintained small or near zero for improved towing performance.

An adjustable drag body 340 may be used. For example, a drag body 340 may have a plurality of flaps, wings, or caps that synchronously deploy, creating a larger drag surface area to create larger drag force 342. For example, axially symmetric flaps may be used. In some embodiments, the drag body 340 may be an annular collar coupled at the back end of the streamer 106. A drag body 340 may have one or more drag surfaces that adjust to vary the effective drag surface area.

Figure 6:
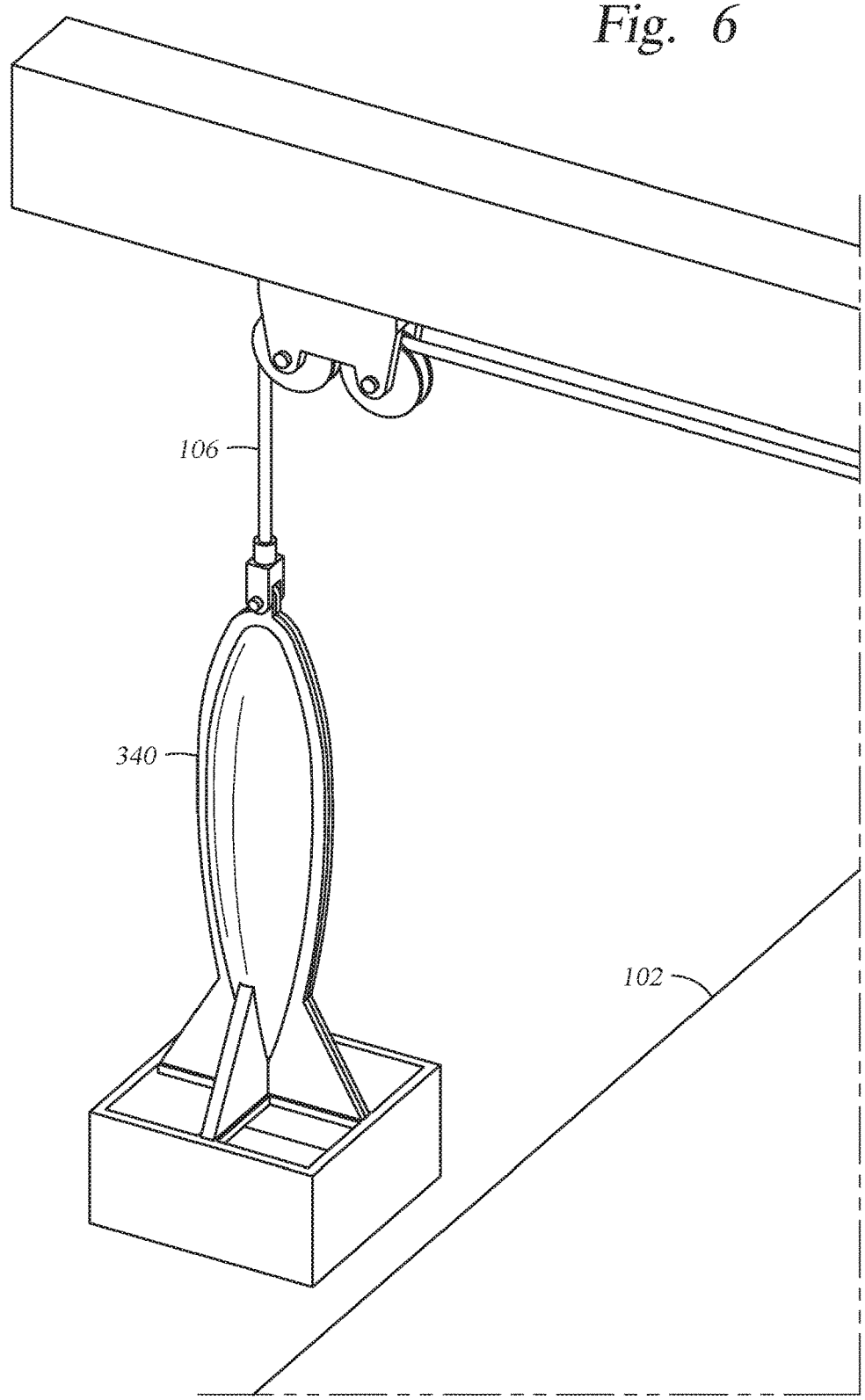
FIG. 6 shows a drag body being retrieved to a survey vessel.

FIG. 6 shows a drag body 340 being retrieved to a survey vessel 102. As illustrated, drag body 340 is coupled to streamer 106 through a swivel, meaning that the drag body 340 is free to rotate independently of the streamer 106. In some instances, the drag body 340 may utilize gyroscopic stabilization to prevent spinning of the drag body 340 that may result in swivel failure, twisting of the streamer 106, and/or breakage and loss of the drag body 340. One example of a suitable drag body 340 may be found in US Patent Application 2015/0117148, which is hereby incorporated by reference. Suitable drag bodies may provide an adjustable amount of drag that applies symmetrically to the aft end of the streamer.

Figure 7:
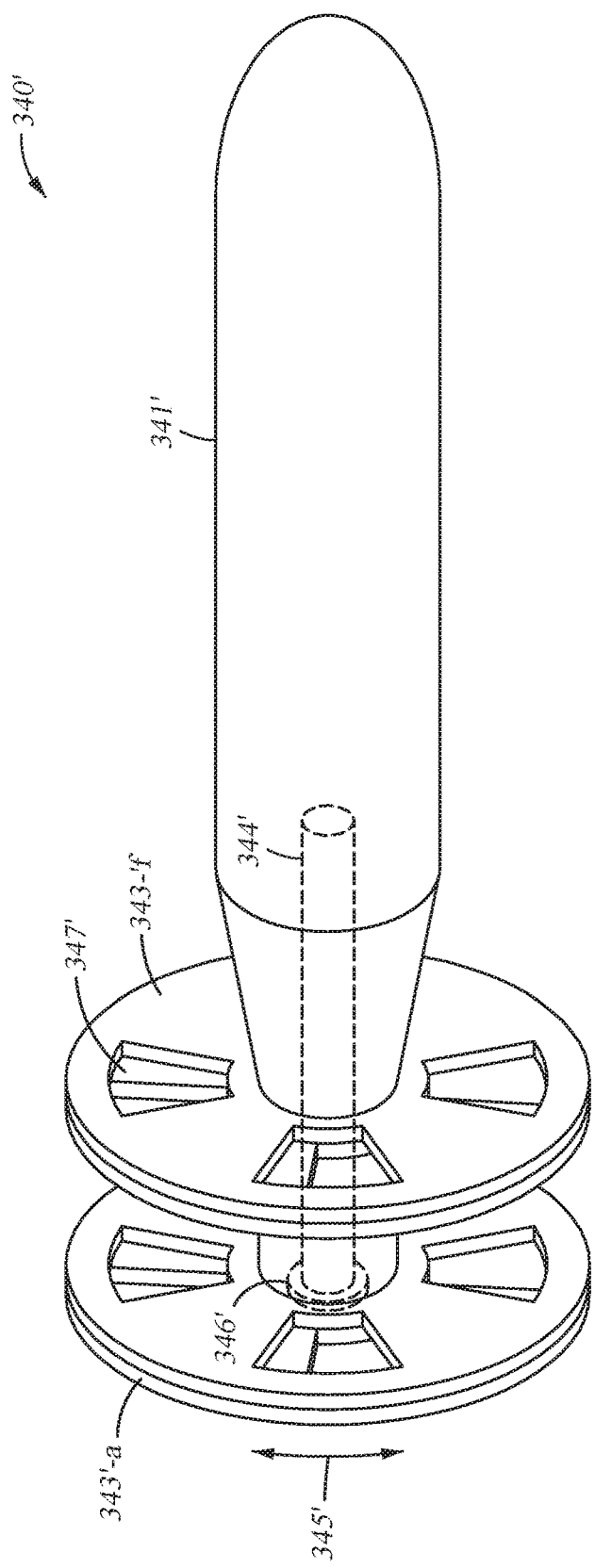
FIG. 7 shows a variable tension control device.
Figure 8A:
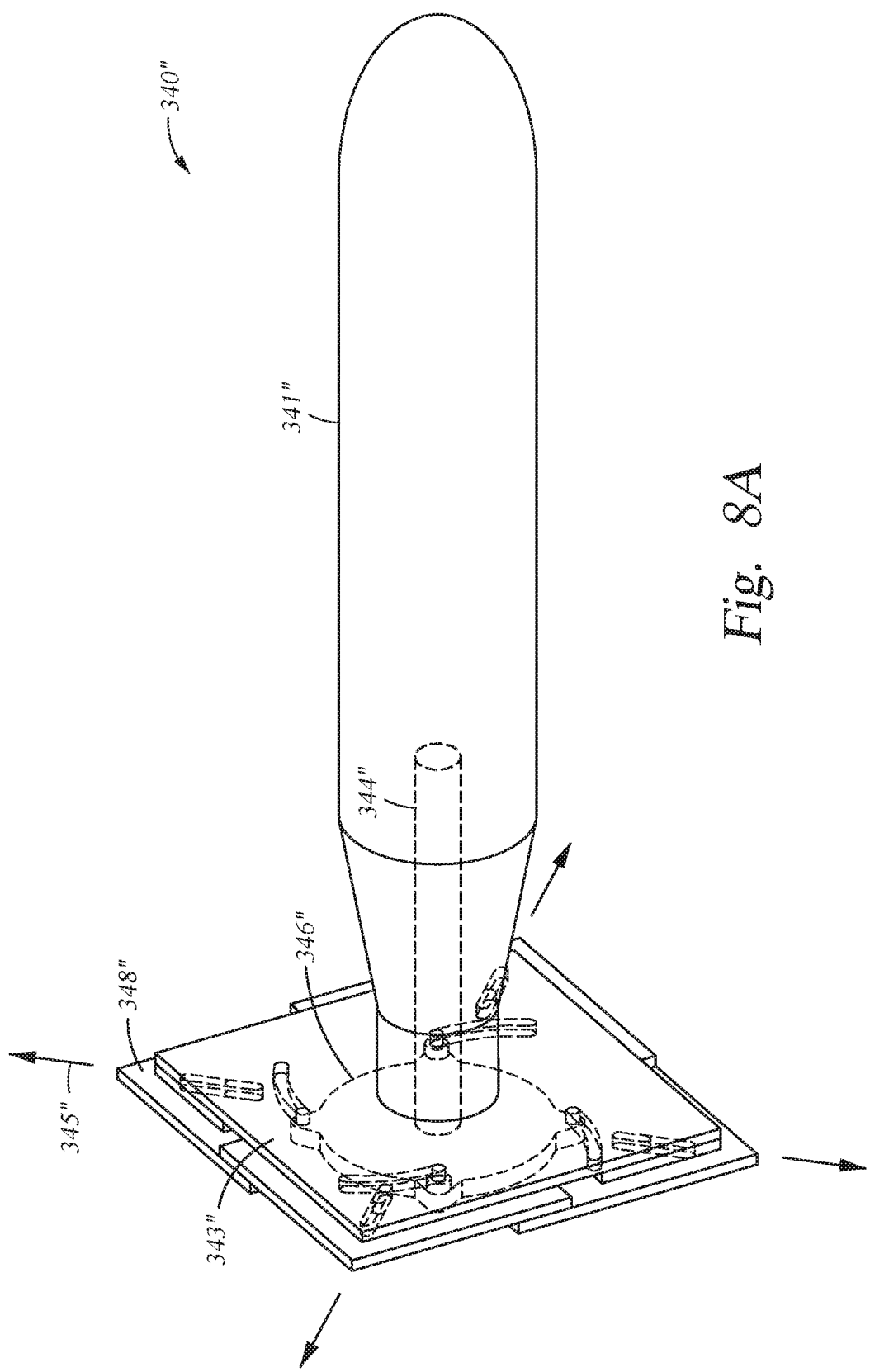
FIGS. 8A-C show a variable tension control device.
Figure 8C:
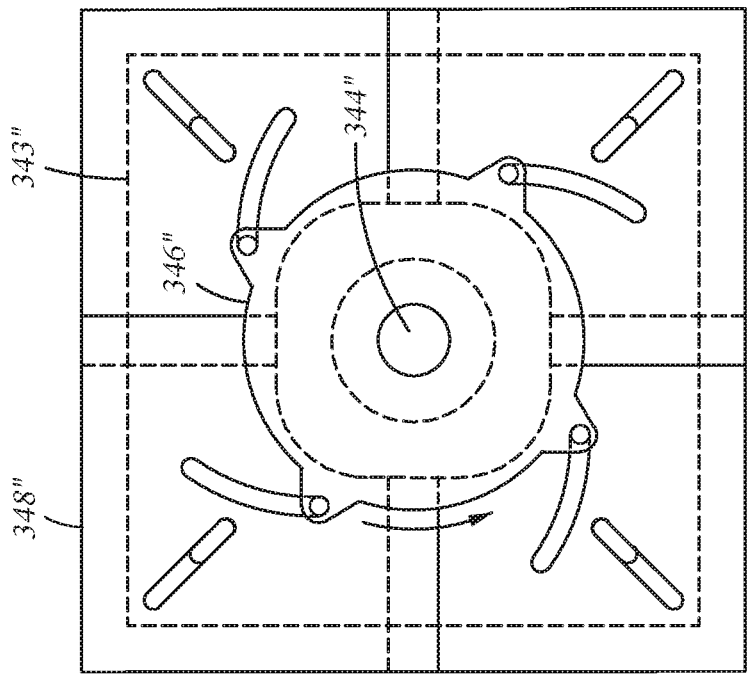
Figure 8B:
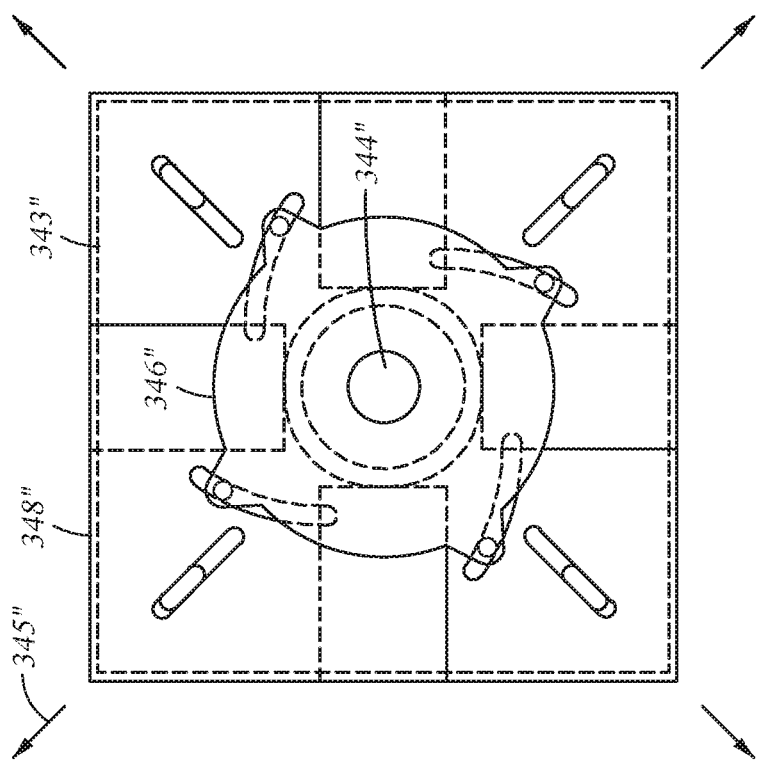

FIGS. 7 and 8A-BC illustrate two example variable tension control (VTC) devices 340' and 340". Each VTC device 340',340" has a body 341',341". Each body 341',341" couples the respective VTC device 340',340" to the streamer 106 while serving to provide stability, ballast, streamlining, and/or other features common to drag bodies. VTC device 340' includes two cooperating drag surfaces (illustrated in expanded view for clarity), forward drag surface 343'-f and aft drag surface 343'-a. The shape and size of drag surfaces 343' may vary to meet operational considerations. The drag surfaces 343' are coupled to each other and to the body 341' by rod 344'. Each drag surface 343' has one or more vents 347' (four shown on each drag surface, but the number, size, and shape of the vents 347' may vary). The drag surfaces 343' may be arranged sufficiently close one another to prevent fluid flow when the vents 347' are adjusted to a closed configuration (i.e., vents 347' not overlapping at all). The drag provided by VTC device 340' therefore decreases as the vents 347' on aft drag surface 343'-a are adjusted to overlap with the vents 347' in forward drag surface 343'-f. Actuator 346' provides rotational adjustment 345' of aft drag surface 343'-a. VTC device 340" includes an adjustable drag surface 343" having one or more retractable flaps 348". Drag surface 343" is coupled to body 341" by rod 344". The shape and size of drag surface 343" and flaps 348" may vary to meet operational considerations. The drag provided by VTC device 340" therefore may decrease as the flaps 348" are retracted. Actuator 346" provides extensional adjustment 345" of flaps 348".

During marine surveying operations, tension control system sensors may be used to identify when and to what extent streamer equipment tension should be adjusted. In some embodiments, tension control system sensors may be disposed at strategically important locations along the streamer equipment, such as the coupling for the depressor 130 and/or collocated with geophysical sensors 109. For example, streamer motion measurements at the coupling for the depressor 130 may indicate whether the depressor is coupled at a node. In another example, it may be beneficial to tune the streamer equipment for harmonics that provide nodes at some or all of the locations of geophysical sensors 109. In other words, measurements made by tensions control system sensors may be used to estimate the location of nodes, and the tension control system may make adjustments designed to change the number and/or location of nodes. In some embodiments, the tension control system sensors may be inertial measurement units (IMU's) with three accelerometers, three gyroscopes, and three inclinometers. IMU's may be used to measure streamer motion and/or estimate the streamer equipment vibration amplitudes and spectral properties. The tension control system may use data from the tension control system sensors to reduce or control streamer equipment vibration according to the survey specifications. The tension control system may use data from the tension control system sensors to reduce or control streamer equipment vibration in real-time, making adjustments immediately responsive to the feedback and/or navigational or operational information (e.g., changing weather conditions). Data acquired by the tension control system sensors and/or responsive control signals may be communicated to components of the tension control system along electrical or optical communication lines used in conventional geophysical streamers. In some embodiments, data acquired by the tension control system sensors and/or responsive control signals may be communicated wirelessly. In other words, communicative coupling may be provided by electrical communication lines, optical communication lines, and/or wireless data transfer.

During marine surveying operations, or in preparation therefor, a tension control system may be utilized to determine and/or achieve a suitable configuration of a geophysical streamer system. An initial configuration may be identified, based on prior experience, modeling, survey planning, etc. The geophysical streamer system components may be used to adjust the tension control factors to achieve the initial configuration of the geophysical streamer system. For example, the initial towing depth of an electromagnetic streamer may be set for a given towing speed. While towing, the tension of the streamer equipment may be gradually varied from a small tension to a large tension, with geophysical sensor measurements and/or tensions control system sensor measurements being taken. Data from the geophysical sensors and/or tension control system sensors may be analyzed to determine a spectral density of streamer equipment motion at various locations and various tensions. It may be desirable to detect locations of low or minimal motion of streamer equipment. It may be desirable to detect movement of resonance peaks located outside frequency range of interest. The analysis may be performed by the tension control system controller in an automated or programmed fashion, or the analysis may be provided by a system user. Based on the data analysis, a desired streamer equipment tension and/or geophysical streamer system configuration may be determined in order to reduce or control streamer equipment vibration and/or induction noise.

In some embodiments, streamer 106 may be an electromagnetic streamer (i.e., a streamer having electromagnetic sensors). As would be understood by one of ordinary skill in the art with the benefit of this disclosure, electromagnetic streamers tend to be towed at a greater depth (e.g., about 50 m-about 150 m) than seismic streamers (i.e., a streamer having seismic sensors). Generally, towing streamers at greater depth reduces sea state noise in the survey data. Seismic streamers, however, are typically towed at shallower depths (e.g., about 10 m) due to concerns about streamer ghost notches in the amplitude spectrum within the seismic frequency range. Consequently, conventional towing configurations for seismic streamers may not include a depressor 130 (or only a considerably smaller depressor), and may replace drag body 340 with a tail buoy (that is located at or near the surface 123 of the water 111). Additionally, electromagnetic survey data may be more susceptible to the effects of induction noise than seismic survey data, due to the preponderance of wires connecting electromagnetic sensor electrodes.

In some embodiments, it may be desirable to maintain a constant towing depth for an electromagnetic streamer, or at least a forward portion of an electromagnetic streamer. For example, it may be desirable to maintain the depth of the forward portion of an electromagnetic streamer to no more than 10% variation from a target towing depth. In some embodiments, an electromagnetic streamer may have target towing depth of about 100 m, and it may be desirable to maintain the depth of the forward portion to between about 90 m and about 110 m. In such embodiments, the tension control system may make streamer equipment tension adjustments that do not adversely affect the towing depth of the forward portion of the electromagnetic streamer. For example, a depressor depth control system may be utilized to control depressor depth and/or pitch angle to provide both tension control and depth control. For example, a depressor depth control system may adjust wing angles of the depressor multi foil wings while also trimming the pitch angle of the depressor to maintain a low or zero pitch for optimal function of the depressor. The depressor depth control system may be located proximal to the depressor, may utilize depth sensors proximal to the depressor and/or the forward portion of the streamer, and may act independently from the tensions control system. In some embodiments, the depressor depth control system may share one or more components with the tension control system. In some embodiments, the depressor depth control system may be a sub-system of the tension control system, being fully coordinated therewith. The depressor depth control system may respond to depressor depth changes more quickly and/or with finer adjustments than the tension control system.

In accordance with a number of embodiments of the present disclosure, a geophysical data product may be produced. The geophysical data product may include, for example, survey data, streamer behavior data, and/or streamer behavior models. Geophysical data, such as data acquired by seismic sensors, electromagnetic sensors, depth sensors, location sensors, tension sensors, motion sensors, tension control system sensors, etc., may be obtained and may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore. For example, geophysical data may be used to create streamer equipment behavior models, and/or to predict or estimate streamer equipment vibrational behavior and/or induction noise.

While the foregoing is directed to embodiments of the present invention, other and further embodiments of the invention may be devised without departing from the basic scope thereof, and the scope thereof is determined by the claims that follow.

The invention claimed is:

1. A geophysical streamer system comprising:
   streamer equipment comprising:
      a geophysical streamer with a plurality of geophysical sensors distributed along the geophysical streamer, including a forward geophysical sensor; and
      a lead-in cable for coupling the geophysical streamer to a survey vessel; and
   a tension control system capable of tuning vibrational behavior of the streamer equipment and comprising:
      a depressor coupled to the streamer equipment in front of the forward geophysical sensor;
      a variable tension control device coupled at a back end of the geophysical streamer; and
      a plurality of tension control system sensors, wherein:
         the plurality of tension control system sensors are disposed at one or more locations consisting of: on the survey vessel, on the depressor, on the variable tension control device, along the lead-in cable, and along the geophysical streamer, and
         at least some of the plurality of tension control system sensors are capable of being used to estimate amplitude or spectral properties of the vibrational behavior of the streamer equipment.

2. The geophysical streamer system of claim 1, wherein at least one of the plurality of geophysical sensors is selected from the group consisting of: seismic sensors and electromagnetic sensors.

3. The geophysical streamer system of claim 2, wherein the plurality of geophysical sensors comprises seismic sensors, and the variable tension control device comprises a tail buoy.

4. The geophysical streamer system of claim 2, wherein the plurality of geophysical sensors comprises electromagnetic sensors, and the geophysical streamer system further comprises a depressor depth control system.

5. The geophysical streamer system of claim 1, wherein the depressor is coupled at a point that corresponds to a predicted or estimated location of a vibrational wave node of the streamer equipment.

6. The geophysical streamer system of claim 1, wherein the plurality of tensions control system sensors comprises a plurality of motion sensors distributed along the streamer.

7. The geophysical streamer system of claim 1, wherein the variable tension control device is a drag body.

8. The geophysical streamer system of claim 7, wherein the drag body comprises one or more flaps, wings, and caps configured to deploy to create a larger drag surface area.

9. The geophysical streamer system of claim 1, further comprising a tension control system communicatively coupled to the plurality of tension control system sensors.

10. The geophysical streamer system of claim 9, wherein the tension control system is communicatively coupled to the variable tension control device and to the depressor.

11. A method of acquiring survey data, the method comprising:
   obtaining first data from tension control system sensors of a geophysical streamer system;
   based on the first data, identifying vibrational behavior of streamer equipment of the geophysical streamer system;
   identifying an adjustment to be made to one or more tension control factors of the geophysical streamer system to reduce or control the vibrational behavior of the streamer equipment;
   making the adjustment to the one or more tension control factors; and
   acquiring the survey data with the geophysical streamer system.

12. The method of claim 11, wherein the adjustment is at least one of:
   changing a speed or towing direction of a survey vessel of the geophysical streamer system;
   changing a length or angle of a lead-in cable of the geophysical streamer system;
   changing a coupling location, length, or angle of a depth rope of the geophysical streamer system;
   changing an angle or magnitude of a depressor force of the geophysical streamer system; and
   changing a drag force of the geophysical streamer system.

13. The method of claim 11, wherein the making the adjustment and the acquiring the survey data occur simultaneously.

14. The method of claim 11, wherein the identifying the adjustment comprises obtaining second data from tension control system sensors.

15. The method of claim 14, wherein the identifying the adjustment further comprises obtaining user input.

16. The method of claim 11, wherein the identified adjustment includes changing the tension of the streamer equipment, the method further comprising making concerted adjustments of a depressor force and a drag force, each force operating on the geophysical streamer system.

17. The method of claim 16, further comprising repeated iterations of:
   obtaining additional data with a plurality of tension control system sensors distributed along the streamer equipment; and
   making additional concerted adjustments of the depressor force and the drag force.

18. The method of claim 16, wherein the making concerted adjustments of the depressor force and the drag force comprises:
   obtaining third data from a plurality of tension control system sensors distributed along the streamer equipment; and
   transmitting control signals to a depressor coupled to the streamer equipment and to a variable tension control device coupled at a back end of the streamer equipment.

19. The method of claim 11, further comprising:
   obtaining geophysical data; and
   processing the geophysical data to produce a geophysical data product.

20. The method of claim 19, further comprising recording the geophysical data product on a non-transitory, tangible, computer-readable medium suitable for importing onshore.

21. The method of claim 19, further comprising performing geophysical analysis onshore on the geophysical data product.

* * * * *